3,065,269
PRODUCTION OF SECONDARY AND
TERTIARY AMINES
Walter Theodore Dent, Norton-on-Tees, England, assignor to Imperial Chemical Industries Limited, London, England, a corporation of Great Britain
No Drawing. Filed Mar. 28, 1958, Ser. No. 724,514
Claims priority, application Great Britain Apr. 12, 1957
10 Claims. (Cl. 260—576)

This invention relates to the production of secondary and tertiary amines.

It is known that secondary or tertiary amines may be prepared by condensing primary or secondary amines respectively with a halogen compound, in the presence of potassium carbonate and a copper catalyst. For example 4-nitrodiphenylamine has been produced by condensing in this way either para-chloronitrobenzene and aniline or para-nitroaniline and bromobenzene. However, the yield obtained in this type of process is rather poor. A purer product and much better yields of secondary and tertiary amines can be obtained if this type of condensation is carried out in accordance with the method which is the subject of the present invention.

According to the present invention a process for the production of secondary or tertiary amines comprises reacting at an elevated temperature an aliphatic carbocyclic or heterocyclic primary or secondary amine with an aliphatic, carbocyclic or heterocyclic halogen compound, in the presence of an acid binding agent comprising potassium or sodium carbonate, bicarbonate or hydroxide, and a compound having the formula $X.CO.NR_1R_2$ in which X is an aromatic structure having a hydroxyl radical attached to the aromatic nucleus in a position adjacent to the —$CO.NR_1R_2$ group, $R_1$ is hydrogen or a substituted or unsubstituted alkyl, carbocyclic or heterocyclic radical, and $R_2$ is a substituted or unsubstituted alkyl, carbocyclic or heterocyclic radical.

Preferably the aromatic structure X of the compound having the formula $X.CO.NR_1R_2$ should not have a substituent halogen atom, as otherwise the reaction product may be contaminated with the condensation product of the said compound and the amine present in the reaction mixture.

It is preferred that the reactant amine should have the formula $NHR_1R_2$, where $R_1$ and $R_2$ are respectively the same as the $R_1$ and $R_2$ radicals contained in the compound having the formula $X.CO.NR_1R_2$. If this is not so, the reaction product may be contaminated with other amines.

The reactant amine is preferably a primary amine.

Of the acid binding agents which may be used in the present invention the most effective is potassium carbonate.

The preferred reaction temperature is one within the range 100°C. to 300°C. Although the reaction may conveniently be effected at atmospheric pressure, it may also be carried out at other pressures, for example between 0.1 and 50 atmospheres.

Suitable reactant amines for use in the present invention include for example aniline and para-toluidine. The reactant halogen compound may conveniently be for example para-chloronitrobenzene, ortho-chlorobenzoic acid or iodobenzene. Suitable examples of the compound having the formula $X.CO.NR_1R_2$ include salicylanilide, and salicyl-para-toluidide.

We have found that the process hereinbefore defined may be effected if the substituted amide $X.CO.NR_1R_2$ is replaced by an ester of the corresponding ortho hydroxy aromatic carboxylic acid.

It is believed that this reaction proceeds through the intermediate formation of the substituted amide $X.CO.NR_1R_2$.

This theory is supported, for example, by the fact that whereas the oily residue produced when methyl salicylate is heated with para-chloronitrobenzene and potassium carbonate is apparently inactive in the attempted condensation of aniline and para-chloronitrobenzene, the product obtained by heating methyl salicylate with aniline and potassium carbonate is active in the aforementioned condensation. Moreover, if methyl salicylate is used in the condensation of aniline and para-chloronitrobenzene, salicylanilide can be recovered from the reaction product by the recovery technique hereinafter described, and may be used for effecting the condensation of further quantities of aniline and para-chloronitrobenzene.

According to a particular form of the invention, therefore, the compound having the formula $X.CO.NR_1R_2$ is formed in situ, preferably by the reaction between an ester of the acid $X.CO.OH$ and the primary or secondary amine of formula $R_1R_2NH$, in the presence of the acid binding agent.

The ester of the said acid $X.CO.OH$ may conveniently be for example methyl salicylate, phenyl salicylate or methyl 2-hydroxy-3-methylbenzoate.

In the process as hereinbefore defined either the substituted amide or the ester, as the case may be, is responsible for a large part of the cost of the raw materials used. We have found that at least part of the substituted amide which was either added initially to the reaction mixture or formed during the reaction may conveniently be recovered from the product. Any process by which even a small amount of this material is recovered in a form suitable for recycle is likely to be of value.

According to a particular feature of the present invention, therefore, there is provided a process as hereinbefore defined in which the said compound having a formula $X.CO.NR_1R_2$ is recovered from the reaction product, in a form suitable for recycling to the reaction mixture, by washing the reaction product with water and/or alkali, acidifying the washings with an acid which is a stronger acid than the compound to be recovered, and, if desired, purifying the resulting precipitate by recrystallisation.

It will be appreciated that the recovered material may be either the substituted amide $X.CO.NR_1R_2$ added initially to the reaction mixture, or such a compound formed in situ, for example from the ester of the ortho hydroxy aromatic carboxylic acid which may be introduced originally in lieu of the substituted amide. The recovered material may be recycled to the reaction mixture and is capable of effecting reaction between further quantities of the amine and halogen compound in the process of this invention.

The reaction product is preferably washed first with water and subsequently with alkali. A convenient alkali for the washing process is 10% aqueous sodium hydroxide solution.

The acidification of the water washings and the alkali washings may be effected with, for example, carbon dioxide or dilute hydrochloric acid.

The precipitate from the acidified washings may, if desired, be purified by dissolving it in 10% aqueous sodium hydroxide solution and acidifying with 10% hydrochloric acid, or alternatively by washing it with dilute hydrochloric acid. The precipitate may then be further purified, for example, by dissolving it in methanol and reprecipitating by the addition of water.

The recovery step of the process which is subject of this invention may be illustrated by considering the reaction between aniline and para-chloronitrobenzene in the presence of methyl salicylate and potassium carbonate, leading to the production of 4-nitrodiphenylamine. Salicylanilide is formed in the reaction, and part of it may be recovered. The reaction product is washed with water, and the washings collected. Salicylanilide is a very weak acid and therefore early washings, which are alkaline, owing to the presence of potassium carbonate, will contain a reasonable amount of this material. Later washings are neutral and thus contain very little salicylanilide. However, further recovery may be effected by washing the reaction product with a 10% aqueous sodium hydroxide solution. Salicylanilide is precipitated by acidifying the washings. The aqueous washings may conveniently be acidified with carbon dioxide, and the sodium hydroxide solution washings treated with dilute hydrochloric acid. If desired, the recovered material may be purified by, for example, dissolving it in methanol and then reprecipitating by the addition of water. The recovered salicylanilide may be used for effecting reaction between further quantities of aniline and para-chloronitrobenzene in the presence of potassium carbonate.

The process of the present invention may be used for the preparation of a wide variety of secondary and tertiary amines. Such amines are important compounds in industry, and are used for example as intermediates in the manufacture of dyestuffs.

The invention is illustrated by the following Examples.

EXAMPLE 1

This example illustrates the preparation of 4-nitrodiphenylamine by the condensation of aniline and para-chloronitrobenzene in the presence of potassium carbonate and either copper formate or methyl salicylate.

The reactants were stirred at 193° C., the temperature being maintained by carrying out the reaction in a vessel which was supported in the vapours above refluxing N:N-dimethylaniline.

The mixture was steam distilled, and the crude product remaining in the boiler, after removal of the supernatant water by decantation, was extracted with petroleum ether (boiling point 100° C. to 120° C.). In the first experiment (using copper formate as catalyst) 100 ml. of petroleum ether were used. In the second case 3×200 ml. were used, and the extracts were combined and cooled to give 4-nitrodiphenylamine. In the experiment in which copper formate was used as a catalyst the product was very dark in colour.

The results obtained are given in Table 1.

phase in the boiler was removed by decantation, and the solid residue was continuously extracted with 600 ml. of petroleum ether (boiling point 100° C. to 120° C.). The resulting solution was cooled, and afforded 36.3 grams of 4-nitrodiphenylamine, representing a yield of 84.8%. The melting point of the product was 133° C., which is the melting point of pure 4-nitrodiphenylamine.

In two similar experiments yields of 35.6 grams and 36.0 grams were obtained, corresponding to yields of 83.2% and 84.1% respectively.

EXAMPLE 3

This example further illustrates the use of methyl salicylate in the condensation of aniline and para-chloronitrobenzene, and shows the effect of a variation in the reaction time. It also demonstrates the poorer yield obtained when copper formate is used as the catalyst.

100 ml. of aniline, 10.6 grams of methyl salicylate, 20 grams of potassium carbonate and 31.5 grams of para-chloronitrobenzene were stirred and heated together at 193° C. for 6 hours in a reaction vessel which was suspended in the vapours of refluxing N:N-dimethylaniline. The reaction product was steam distilled and the residue was extracted to give 20.3 grams of 4-nitrodiphenylamine (melting point 123° C.), representing a yield of 47.4%.

In a similar experiment in which 2.9 grams of copper formate replaced by methyl salicylate the yield of 4-nitrodiphenylamine was 5.1 grams (melting point 122° C. to 124° C.), representing a yield of 11.9%.

In a similar experiment, using methyl salicylate, but with a reaction time of 4 hours, the yield of 4-nitrodiphenylamine was 21.2 grams, corresponding to a 49.5% yield. Hence under these conditions there appears to be no advantage in continuing the reaction beyond 4 hours.

EXAMPLE 4

This example illustrates a preferred way of carrying out the condensation of aniline and para-chloronitrobenzene, using salicylanilide preformed from methyl salicylate. The example also illustrates the effect of variation of reaction time.

100 ml. of aniline, 10.6 grams of methyl salicylate and 20 grams of potassium carbonate were stirred and refluxed together for 1 hour. 31.5 grams of para-chloronitrobenzene were added and the mixture stirred and refluxed for 6 hours. Steam distillation and extraction of the residue as previously described gave 29.6 grams of 4-

*Table 1*

| Quantities of reactants used | | | | | Time, hours | 4-nitro-diphenylamine | | |
|---|---|---|---|---|---|---|---|---|
| Aniline, ml. | Parachloro nitro-benzene, gm. | Potassium carbonate, gm. | Copper formate, gm. | Methyl salicylate, gm. | | Gm. | Percent | M.P., °C. |
| 33 | 10 | 6 | 0.1 | ---------- | 5 | 1.2 | 8.8 | 120–122 |
| 33 | 10 | 6 | ---------- | 2 | 5 | 6.9 | 50.8 | 126–128 |

The results show that the yield of 4-nitrodiphenylamine is very much better when methyl salicylate is used instead of copper formate as catalyst.

The true melting point of 4-nitrodiphenylamine is 133° C.

EXAMPLE 2

This example illustrates the use of salicylanilide in the condensation of aniline and para-chloronitrobenzene in the presence of potassium carbonate.

A mixture of 20 grams of potassium carbonate, 14.9 grams of salicylanilide, 31.5 grams of para-chloronitrobenzene and 100 ml. of aniline was heated and stirred at 193° C. for 6 hours.

The mixture was then steam distilled. The aqueous nitrodiphenylamine, representing a yield of 69.1%. The melting point of the product was 130° C.

In two other experiments using the same procedure but reaction times in the second stage of the process of 4 and 2 hours respecitvely, and yields were 29.5 grams (68.9%) and 23.7 grams (55.4%) respectively.

The next three examples illustrate the reaction of aniline, in the presence of methyl salicylate and potassium carbonate, with different halogen compounds.

EXAMPLE 5

100 ml. of aniline, 40 grams of potassium carbonate and 10.6 grams of methyl salicylate were stirred and refluxed for 1 hour at about 185° C. and some light ends were run off. 31.3 grams of ortho-chlorobenzoic acid were added and the mixture was stirred and refluxed for a further 3 hours at about 190° C. The mixture was steam distilled to remove the excess aniline. The aqueous mixture in the boiler was refluxed with decolourising charcoal and filtered. The filtrate was poured into a mixture of 60 ml. of water and 30 ml. concentrated hydrochloric acid and the precipitated N-phenylanthranilic acid was filtered off. 41.5 grams were obtained, representing a yield of about 100%. After recrystallisation a sample had a melting point of 175° to 178° C. The melting point quoted in the literature varies from 179° to 183° C.

EXAMPLE 6

100 ml. of aniline, 20 grams of potassium carbonate and 10.6 grams of methyl salicylate were reacted as in Example 5. 40.8 grams of iodobenzene were added and the mixture stirred and refluxed at about 183° C. for 12 hours. Steam distillation removed first the excess aniline and then diphenylamine (16.8 grams, 49.7%, melting point 47° to 50° C.). The melting point given in the literature is 54° C.

In the absence of methyl salicylate the yield of diphenylamine varied from 4.0 grams (11.8% to 8.6 grams (25.4%).

EXAMPLE 7

100 ml. of aniline, 20 grams of potassium carbonate and 10.6 grams of methyl salicylate were reacted as in Example 5. 22.7 grams of 2-chloropyridine were added and the mixture stirred and refluxed for 12 hours. Steam distillation removed first and excess aniline and 2-chloropyridine and then gave 2-anilinopyridine (4.9 grams, 14.4%, melting point 103° to 105° C. after crystallisation). The melting point quoted in the literature is 107° to 108.5° C.

In the absence of methyl salicylate, and working with half the above quantities, the yield was 0.2 gram (1.2%), melting point 102.5° to 104° C.

The next two examples illustrate the reaction of aniline, in the presence of salicylanilide and potassium carbonate, with different halogen compounds.

EXAMPLE 8

100 ml. of aniline, 20 grams of potassium carbonate, 14.9 grams of salicylanilide and 40.8 grams of iodobenzene were stirred and refluxed for 12 hours at about 183° C. The mixture was steam distilled, as in Example 6, to give 8.3 grams of diphenylamine, representing a yield of 24.6%.

EXAMPLE 9

100 ml. of aniline, 20 grams of potassium carbonate 14.9 grams of salicylanilide were stirred and refluxed for 1 hour. 22.7 grams of 2-chloropyridine were added and the mixture stirred and refluxed for a further 12 hours. Steam distillation of the mixture, as in Example 7, afforded 6.8 grams of 2-anilinopyridine (melting point 100° to 102° C.), representing a yield of 20%.

The next two examples illustrate the applicability of the process to amines other than aniline.

EXAMPLE 10

117 grams of para-toluidine, 10.6 grams of methyl salicylate and 20 grams of potassium carbonate were stirred and refluxed at about 190° C. for 1 hour. 31.5 grams of parachloronitrobenzene were added and the mixture was stirred and heated at about 190° C. for 6 hours. The mixture was steam distilled to remove the excess reactants. The aqueous layer remaining in the boiler was decanted and the solid residue was extracted with petroleum ether (boiling point 100° to 120° C.). On cooling, the extracts afforded 4-methyl-4'-nitro-diphenylamine (15.1 grams, 33.1%, melting point 125° to 126° C.). The melting point quoted in the literature varies from 136° to 139° C.

EXAMPLE 11

117 grams of para-toluidine, 15.9 grams of salicyl-para-toluidide and 20 grams of potassium carbonate were refluxed for 30 minutes. 31.5 grams of para-chloro-nitrobenzene were added and the mixture stirred and heated at about 190° C. for 6 hours. The mixture was worked up as described in Example 10 to give 4-methyl-4'-nitro-diphenylamine (38.4 grams, 84.2%, melting point 134° to 135° C.).

In a similar experiment at a reflux temperature of about 210° C. the yield was 29.2 grams (64.0%). The melting point was 117° to 118° C. and after crystallisation 135° to 135.5° C.

When the salicyl-para-toluidide was replaced by 1.2 grams of copper bronze the yield was 1.6 grams (3.5%), melting point 112° C.

The next two examples illustrate the use of esters other than methyl salicylate in the reaction of aniline and para-chloronitrobenzene.

EXAMPLE 12

100 ml. of aniline, 15 grams of phenyl salicylate and 20 grams of potassium carbonate were stirred and refluxed for 1 hour at about 183° C. 31.5 grams of para-chloro-nitrobenzene were added and the reaction mixture was stirred and refluxed at about 184° to 188° C. for 8.1/4 hours. The mixture was steam distilled to remove the excess aniline. The aqueous phase in the boiler was separated by decantation and the solid residue was extracted with petroleum ether (boiling point 100° to 120° C.) to give 17.4 grams of 4-nitro-diphenylamine, representing a yield of 40.6%.

EXAMPLE 13

100 ml. of aniline, 20 grams of potassium carbonate and 11.6 grams of methyl-2-hydroxy-3-methylbenzoate were stirred and refluxed for 1 hour. 31.5 grams of para-chloronitrobenzene were added, and the mixture was stirred and refluxed for 6 hours. The reaction product was steam distilled to remove the excess aniline and unreacted para-chloronitrobenzene. The residue remaining in the boiler, after removal of the aqueous layer by decantation, was extracted with petroleum ether (boiling point 100° to 120° C.) to give 8.4 grams of 4-nitro-diphenylamine of melting point 121° to 122° C. This represents a pass yield of 19.6%.

EXAMPLE 14

In this example the use of different acid binding agents is illustrated for the reaction between aniline and para-chloronitrobenzene in the presence of salicylanilide.

100 ml. of aniline, 14.9 grams of salicylanilide and the acid binding agent were stirred and heated at 183° C. for a period. 31.5 grams of para-chloronitrobenzene were added and the reaction mixture stirred and refluxed for a further period. The mixture was worked-up as described in Example 12.

The results are summarised in Table 2.

*Table 2*

| Alkali | Weight, gm. | Reaction times | | Yield of 4-nitro-diphenylamine | |
|---|---|---|---|---|---|
| | | Stage 1, hours | Stage 2, hours | Weight, gm. | Percent |
| KHCO₃ | 40 | 1 | 5.5 | 31.2 | 72.9 |
| Na₂CO₃ | 15.5 | 1 | 17 | 13.6 | 31.8 |

EXAMPLE 15

In this example the use of different acid binding agents is illustrated for the reaction between aniline and para-chloronitrobenzene in the presence of methyl salicylate.

The procedure was the same as that adopted in Example 14, except that the salicylanilide was replaced by 10.6 grams of methyl salicylate. The results of these experiments are given in Table 3.

In the third experiment (i.e. when a mixture of potassium and sodium carbonates was used) the potassium carbonate was added initially, and the sodium carbonate was added, together with the para-chloronitrobenzene, after the first stage of the process.

*Table 3*

| Alkali | Weight, gm. | Reaction times | | Yield of 4-nitro-diphenylamine | |
|---|---|---|---|---|---|
| | | Stage 1, hours | Stage 2, hours | Weight, gm. | Percent |
| KHCO₃ | 40 | 2 | 6 | 9.7 | 22.7 |
| KOH | 16.3 | 1 | 6 | 9.6 | 22.4 |
| K₂CO₃+ | 4.8 | 1 | 6 | 10.8 | 25.2 |
| Na₂CO₃ | 11.7 | | | | |
| K₂CO₃ | 4.8 | 1 | 4 | 7.9 | 18.4 |

The next three examples illustrate the recovery of salicylanilide from the product of the reaction of aniline and para-chloronitrobenzene in the presence of methyl salicylate and potassium carbonate.

EXAMPLE 16

2070 ml. of aniline were stirred with 600 grams of potassium carbonate and the mixture was heated to reflux. About 10 ml. of water was evolved during this heating-up process. 318 grams of methyl salicylate were added over a period of 35 to 40 minutes, and the light ends, which were composed mainly of methanol, were collected in a separator. The reaction mixture was then refluxed for a further 60 minutes.

945 grams of para-chloronitrobenzene were dissolved in 930 ml. of aniline at not less than 30° C., and the solution was added to the stirred refluxing reaction mixture over a period of about 45 minutes. The reaction mixture was stirred and refluxed for a further 6 hours and then washed with water (2×2.5 litres) at about 70° C. During the 6 hour period about 25 to 30 ml. of water collected in the separator.

The first aqueous washings were treated with carbon dioxide. The precipitated solid was filtered, dissolved in 10% aqueous sodium hydroxide solution and reprecipitated with 10% hydrochloric acid. It was then dissolved in methanol and reprecipitated with water to give 24.8 grams of salicylanilide of melting point 120° to 125° C.

The second washings gave 28.5 grams of salicylanilide by the same procedure, the melting point being 122° to 126° C.

The salicylanilide is reasonably pure, but, if desired, may be purified further by recrystallisation from benzene/petroleum ether.

EXAMPLE 17

The reaction was effected as described in Example 16 except that the crude reaction product was washed three times with 2.5 litres of water at about 70° C., and each washing was treated separately with carbon dioxide.

The precipitate from the first washing was filtered off and washed with dilute hydrochloric acid to remove a small amount of aniline. It was then subjected to the methanol-water treatment to give 26.2 grams of salicylanilide of melting point 132° to 134° C.

The precipitate from the second washing afforded, after the hydrochloric acid washing, 35.5 grams of product of melting point 129° to 131° C.

The precipitate from the third washing, which was neutral, afforded only 1.1 grams of salicylanilide of melting point 126° to 128° C.

EXAMPLE 18

The reaction was carried out as described in Example 16 except that the following quantities of materials were used: 450 ml. of aniline, 100 grams of potassium carbonate, 53 grams of methyl salicylate, and 157.5 grams of para-chloronitrobenzene dissolved in 250 ml. of aniline. The reaction product was washed twice with 500 ml. of water at about 70° C. The combined washings were treated with carbon dioxide and yielded 12.5 grams of salicylanilide.

The crude reaction product was then washed three times with 500 ml. of cold 10% sodium hydroxide solution, and each washing was separately acidified with 10% hydrochloric acid. The yields of salicylanilide from these three washings were respectively 3.4 grams, 1.2 grams and 0.7 gram.

EXAMPLE 19

This example illustrates the reaction between aniline and para-chloronitrobenzene in the presence of potassium carbonate and salicylanilide recovered from the reaction mixtures used in Examples 16 to 18.

A mixture of 100 grams of potassium carbonate, 74.5 grams of salicylanilide recovered as described in Examples 16 to 18, 157.5 grams of para-chloronitrobenzene and 500 ml. of aniline was heated and stirred at 193° C. for 6 hours. The mixture was then steam distilled. The aqueous phase remaining in the boiler was removed by decantation and the solid residue was continuously extracted with 4×500 ml. of petroleum ether of boiling point 100° to 120° C. The resulting solution was cooled and afforded 174.5 grams of 4-nitrodiphenylamine, representing a yield of 81.5%. The melting point of the product was 129° C.

I claim:
1. In a process for the production of secondary aromatic amines by reacting a primary benzene amine,
    wherein the amine group is attached directly to the benzene ring which is free from interfering substituents,
with a halogen compound in which the halogen atom is attached directly to the carbon atom of the ring of a compound selected from the class consisting of benzene and pyridine,
    and in which any further substituents on the ring are selected from the class consisting of carboxyl and nitro groups;
in the presence of an acid-binding agent selected from the group consisting of potassium carbonate, potassium bicarbonate, potassium hydroxide, sodium carbonate, sodium bicarbonate, and sodium hydroxide; the improvement which consists essentially in conducting the reaction in the presence of an aromatic amide having the formula:

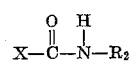

wherein
    X is selected from the group consisting of o-hydroxy-substituted phenyl and tolyl radicals; and
    R₂ is selected from the group consisting of phenyl and tolyl radicals.
2. The process of claim 1, wherein said aromatic amide is formed in situ by reaction between an ester selected from the group consisting of methyl salicylate, phenyl salicylate, and methyl-2-hydroxy-3-methyl benzoate, and an amine of the formula

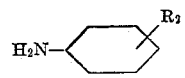

wherein R₂ has the same meaning as in claim 1.
3. The process of claim 1, wherein the reactant amine is para-toluidine.
4. The process of claim 1, wherein the organic halogen compound is chloronitrobenzene.
5. The process of claim 1, wherein the organic halogen compound is ortho-chlorobenzoic acid.

6. A process according to claim 1 in which the acid binding agent is potassium carbonate.

7. A process according to claim 1 in which the reaction temperature is within the range 100° C. to 300° C.

8. A process according to claim 1 in which the reactant amine is aniline.

9. A process according to claim 1 in which the organic halogen compound is iodobenzene.

10. A process for the production of 4-nitrodiphenylamine, comprising reacting aniline with para-chloronitrobenzene, at a temperature within the range 100° C. to 300° C., in the presence of potassium carbonate and in the presence of salicylanilide.

References Cited in the file of this patent

UNITED STATES PATENTS

| | | |
|---|---|---|
| 675,217 | Homolka et al. | May 28, 1901 |
| 2,006,735 | Fischer et al. | July 2, 1935 |
| 2,393,673 | Wyss et al. | Jan. 29, 1946 |
| 2,676,188 | Bruce et al. | Apr. 20, 1954 |